US008010016B2

(12) United States Patent
Kurotsu et al.

(10) Patent No.: US 8,010,016 B2
(45) Date of Patent: Aug. 30, 2011

(54) OPTICAL UNIT ASSEMBLY WITH HEIGHT ADJUSTING MEMBER, IMAGE READER AND IMAGE FORMING APPARATUS

(75) Inventors: Yoshihiko Kurotsu, Osaka (JP); Kotaro Kawasaki, Osaka (JP); Yoshiyuki Asakawa, Osaka (JP)

(73) Assignee: Kyocera Mita Corporation (JP)

( * ) Notice: Subject to any disclaimer, the term of this patent is extended or adjusted under 35 U.S.C. 154(b) by 820 days.

(21) Appl. No.: 12/049,599

(22) Filed: Mar. 17, 2008

(65) Prior Publication Data

US 2008/0231913 A1    Sep. 25, 2008

(30) Foreign Application Priority Data

Mar. 19, 2007 (JP) .................................. 2007-071002
Mar. 22, 2007 (JP) .................................. 2007-074301

(51) Int. Cl.
*G03G 15/00* (2006.01)
(52) U.S. Cl. ....................................................... 399/118
(58) Field of Classification Search .................. 399/118, 399/127, 107
See application file for complete search history.

(56) References Cited

FOREIGN PATENT DOCUMENTS

| JP | 2000249953 A | * | 9/2000 |
| JP | 2004-274651 | | 9/2004 |
| JP | 2004274651 A | * | 9/2004 |

* cited by examiner

*Primary Examiner* — David Gray
*Assistant Examiner* — Billy J Lactaoen
(74) *Attorney, Agent, or Firm* — Gerald E. Hespos; Michael J. Porco

(57) ABSTRACT

An optical unit assembly is provided with an optical system including an optical component for irradiating a target object with light and receiving the reflected light, a casing for accommodating the optical system, a supporting frame for supporting a part of the casing, and a height adjusting member having a supporting surface for supporting another part of the casing and placed between the supporting frame and the casing. The height adjusting mechanism is slidable between the supporting frame and the casing with a supported state of the casing by the supporting frame substantially maintained, and the supporting surface includes at least a first supporting surface set at a specified first height position and a second supporting surface set at a second height position different from the first height position.

10 Claims, 15 Drawing Sheets

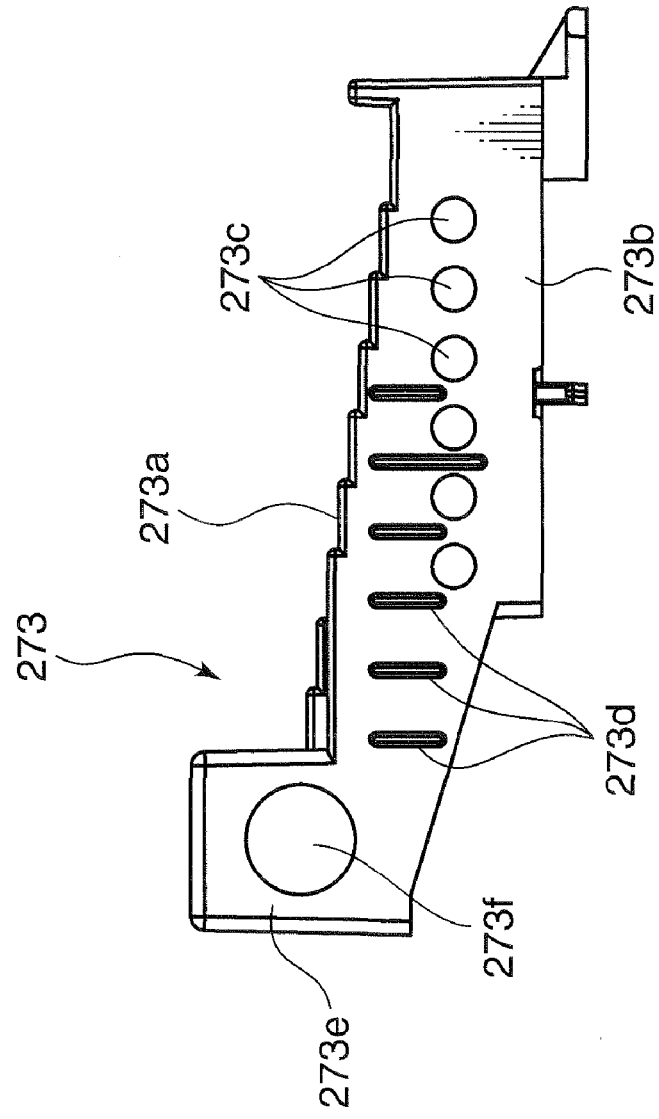
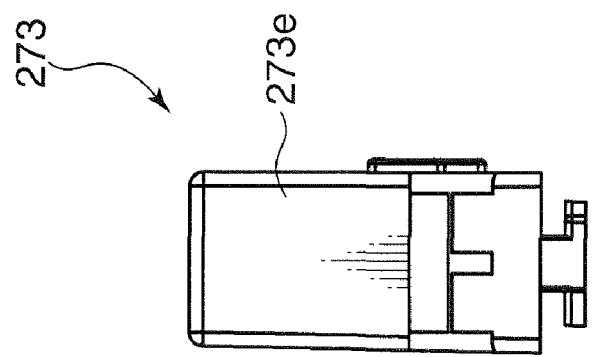
FIG.15A
FIG.15B

OPTICAL UNIT ASSEMBLY WITH HEIGHT ADJUSTING MEMBER, IMAGE READER AND IMAGE FORMING APPARATUS

BACKGROUND OF THE INVENTION

1. Field of the Invention

The present invention relates to an optical unit assembly including an optical system, an image reader for optically reading a document image and an image forming apparatus provided with an image reader.

2. Description of the Related Art

Generally, an image reader optically reads a document by irradiating the document placed on a document placement surface with light from a light source via a lens or the like and receiving the reflected light from the document by means of image pickup elements such as CCDs (Charge Coupled Devices). An optical unit containing the light source, the lens, the CCDs and the like in a casing is generally accommodated in a box-shaped image reader frame having the document placement surface.

If the above optical unit is installed oblique to the document placement surface in the image reader constructed as above, there might be a defect in a read image. Accordingly, such an inclination is solved by adjusting the height of the casing of the optical unit with respect to the image reader frame.

As a mechanism for adjusting the above inclination, a construction in which a stepped inclination adjusting member is slidably arranged between a casing of an optical unit and an image reader frame to support the casing of the optical unit is proposed in Japanese Unexamined Patent Publication No. 2004-274651. With this proposed technology, the position of the step supporting the casing of the optical unit is changed by horizontally sliding the inclination adjusting member, whereby the inclination of the optical unit can be adjusted.

However, the technology of Japanese Unexamined Patent Publication No. 2004-274651 presumes to solve the inclination of the optical unit upon assembling the optical unit into the image reader frame, and it is difficult to adjust the inclination once the optical unit is assembled. In other words, there has been a problem of being unable to change the position of the inclination adjusting member afterward since the inclination adjusting member is fixed at a specified position of the image reader after being slid during the assembling.

SUMMARY OF THE INVENTION

An object of the present invention is to enable the inclination of an optical unit to be easily adjusted even after the optical unit is assembled into a frame.

One aspect of the present invention seeking to accomplish this object is directed to an optical unit assembly, comprising an optical system including an optical component for irradiating a target object with light and receiving the reflected light; a casing for accommodating the optical system; a supporting frame for supporting a part of the casing; and a height adjusting member having a supporting surface for supporting another part of the casing and placed between the supporting frame and the casing. The height adjusting mechanism is slidable between the supporting frame and the casing in a supported state that the casing is substantially supported by the supporting frame, and the supporting surface includes at least a first supporting surface set at a specified first height position and a second supporting surface set at a second height position different from the first height position.

Another aspect of the present invention is directed to an image reader, comprising an optical system including an optical component for irradiating a document to be read with light and receiving the reflected light; a casing for accommodating the optical system; a frame adapted to accommodate the casing and having a bottom surface portion for supporting a part of the bottom surface of the casing; a casing supporting member to be attached to the bottom surface of the casing; a height adjusting member attached to the bottom surface portion of the frame in such a manner as to be slidable in a horizontal direction and having a supporting surface for supporting another part of the bottom surface of the casing; and a grip secured to the height adjusting member for giving a moving force to slide the height adjusting member along the bottom surface portion of the frame. The supporting surface of the height adjusting member includes at least a first supporting surface set at a specified first height position and a second supporting surface set at a second height position different from the first height position, the casing supporting member is supported by the supporting surface of the height adjusting member and has the height position thereof adjusted by being supported by the first or second supporting surface as the height adjusting member is slid, and the grip projects outward of the frame so as to be operable from the outside of the frame.

Still another aspect of the present invention is directed to an image forming apparatus, comprising an apparatus main body having a housing structure and adapted to perform an image forming operation based on a document image data read by an optical system; an image reading station arranged above the apparatus main body and having a housing structure for accommodating the optical system including an optical component for irradiating a document to be read with light and receiving the reflected light in the housing; a supporting frame horizontally arranged on the upper surface of the apparatus main body for supporting a part of the bottom surface of the image reading station; a height adjusting member attached to the supporting frame in such a manner as to be slidable in a horizontal direction and having a supporting surface for supporting another part of the bottom surface of the image reading station; and an adjustable member to be attached to the bottom surface of the image reading station. The supporting surface of the height adjusting member includes at least a first supporting surface set at a specified first height position and a second supporting surface set at a second height position different from the first height position, and the adjustable member is supported by the supporting surface of the height adjusting member and has the height position thereof adjusted by being supported by the first or second supporting surface as the height adjusting member is slid.

These and other objects, features, aspects and advantages of the present invention will become more apparent upon a reading of the following detailed description and accompanying drawings.

BRIEF DESCRIPTION OF THE DRAWINGS

FIGS. 15A and 15B are a right side view and a front view of an adjusting member.

DETAILED DESCRIPTION OF THE PREFERRED EMBODIMENTS

Hereinafter, embodiments of the present invention are described in detail with reference to the accompanying drawings.

First Embodiment

Figure 1:
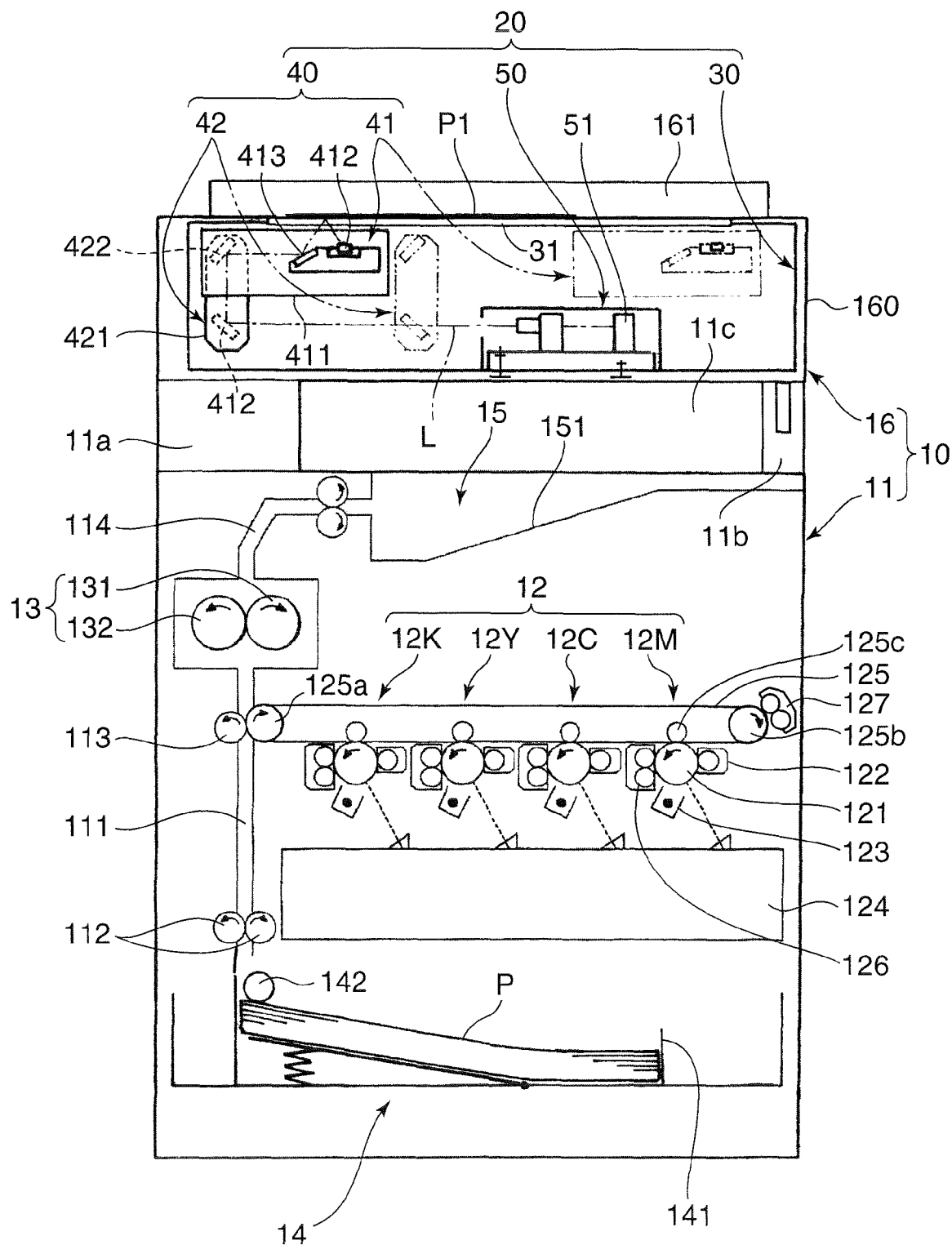
FIG. 1 is a front view schematically showing an image forming apparatus according to a first embodiment of the invention.
Figure 2:
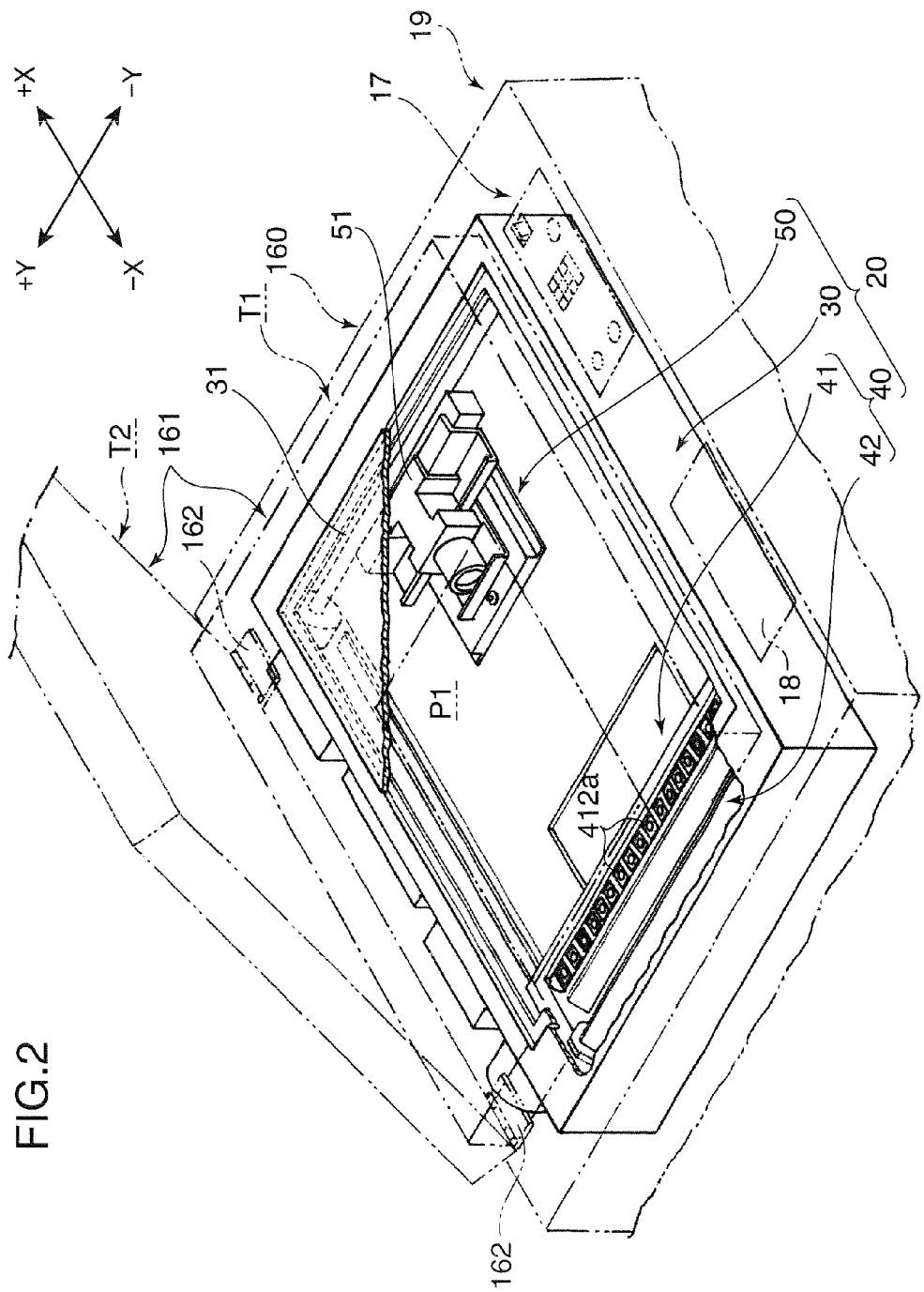
FIG. 2 is a perspective view of an image reader shown in FIG. 1.

FIG. 1 is a front view schematically showing an image forming apparatus 10 according to a first embodiment of the present invention. FIG. 2 is a perspective view showing an image reader shown in FIG. 1. In FIGS. 1 and 2, X-X directions are transverse directions and Y-Y directions are forward and backward directions, wherein, particularly, −X direction is leftward direction; +X direction rightward direction; −Y direction forward direction; and +Y direction backward direction. These directions hold true for FIGS. 3 to 8 as well.

In the first embodiment, a tandem color copier is illustrated as an image forming apparatus 10 (or an optical unit assembly). The image forming apparatus 10 is provided with an image forming apparatus main body (hereinafter, "apparatus main body") 11 having a housing structure, a box-shaped image reader frame (or frame) 16 supported on the upper surface of the apparatus main body 11 and an optical unit (or casing, a part of an image reader) accommodated in the image reader frame 16. In this embodiment, the image reader frame 16 is supported by a supporting portion 11a provided at the left end of the apparatus main body 11 and a supporting column 11b provided at the right back, and a rear end of a space between the apparatus main body 11 and the image reader frame 16 is closed by a rear cover 11c.

In the apparatus main body 11 are provided an image forming assembly 12 for forming an image based on a document image data read by the optical unit 20, a fixing device 13 for applying a fixing process to an image formed by the image forming assembly 12 and transferred to a sheet P and a sheet storage unit 14 for storing transfer sheets P. A discharge unit 15 including an internal discharge tray 151 for receiving the discharged sheet P after the fixing process is provided atop the apparatus main body 11.

The image reader frame 16 accommodates and supports the optical unit 20. The exterior of the image reader frame 16 is covered by an outer cover 160. The outer cover 160 includes a contact glass 31 on its upper surface and a document mat 161 openably and closably provided to press a document placed on the contact glass 31. The document mat 161 is rotatable in forward and reverse directions about a hinge axis of a pair of hinge members 162 (see FIG. 2) at rear positions (at the back side when viewed from an operating position of an operator) on the upper surface of the outer cover 160 and is displaceable between a closing position T1 to close the upper surface of the contact glass 31 and an exposing position T2 to expose the upper surface of the contact glass 31.

The optical unit 20 optically reads a document image by irradiating a document with light and receiving the reflected light via the contact glass 31 with the document placed on the contact glass 31 pressed by the document mat 161. The image information of the document read by the optical unit 20 is outputted to the image forming assembly 12 after specified data processings are applied thereto.

An operation panel 17 used to input processing conditions on document reading, copying and the like is arranged at a specified position of the outer cover 160, and an LCD (Liquid Crystal Display) 18 is arranged adjacent to the operation panel 17. An operation unit 19 including the operation panel 17 and the LCD 18 is detachable from the image reader frame 16 and the outer cover 160 in this embodiment.

The image forming assembly 12 is adapted for forming a toner image on a sheet P fed from the sheet storage unit 14. In this embodiment, the image forming assembly 12 includes a magenta unit 12M, a cyan unit 12C, a yellow unit 12Y and a black unit 12K successively arranged from an upstream side (right side in FIG. 1) toward a downstream.

Each of the units 12M, 12C, 12Y and 12K includes a photoconductive drum 121 and a developing device 122. Each photoconductive drum 121 receives the supply of toner from the corresponding developing device 122 while being rotated counterclockwise in FIG. 1. The toner is supplied from an unillustrated toner cartridge arranged in a front of the apparatus main body 11 (front with respect to the plane of FIG. 1) to each developing device 122.

A charger 123 is disposed at a position immediately below each photoconductive drum 121, and an exposure device 124 is disposed at a position below the charger 123. The photoconductive drums 121 have the circumferential surfaces thereof uniformly charged by the chargers 123, and the exposure devices 124 irradiate the circumferential surfaces of the photoconductive drums 121 with laser beams corresponding to the respective colors based on an image data read by the optical unit 20. In this way, electrostatic latent images are formed on the circumferential surfaces of the respective photoconductive drums 121. Toners are supplied from the developing devices 122 to such electrostatic latent images to form toner images on the circumferential surfaces of the photoconductive drums 121.

A transfer belt 125 mounted between a drive roller 125a and a driven roller 125b in such a manner as to touch the respective photoconductive drums 121 is provided above the photoconductive drums 121. This transfer belt 125 turns between the drive roller 125a and the driven roller 125b in synchronism with the respective photoconductive drums 121 while being pressed against the circumferential surfaces of the photoconductive drums 121 by transfer rollers 125c disposed in correspondence with the respective photoconductive drums 121.

Accordingly, as the transfer belt 125 turns, a magenta toner image on the photoconductive drum 121 of the magenta unit 12M is transferred to the outer surface of the transfer belt 125 and, successively, a cyan toner image on the photoconductive drum 121 of the cyan unit 12C is transferred to be superimposed at the same position of the transfer belt 125. Thereafter similarly, a yellow toner image on the photoconductive drum 121 of the yellow unit 12M and a black toner image on the photoconductive drum 121 of the black unit 12K are successively superimposed. In this way, a color image is formed on the outer surface of the transfer belt 125. This color image is transferred to a sheet P conveyed from the sheet storage unit 14.

A cleaning device 126 for cleaning the circumferential surface of the photoconductive drum 121 by removing the residual toner is arranged at a position to the left of each photoconductive drum 121. The circumferential surface of the photoconductive drum 121 cleaned by the cleaning device 126 heads for the charger 123 for a new charging process. The waste toner removed from the circumferential surface of the photoconductive drum 121 in the cleaning device 126 is collected into an unillustrated toner collection bottle through a specified route.

A vertically extending sheet conveyance path 111 is formed to the left of the image forming assembly 12. A pair of conveying rollers 112 are disposed at a specified position of this sheet conveyance path 111. A sheet P fed from the sheet storage unit 14 is conveyed toward the transfer belt 125 mounted on the drive roller 125a by driving this pair of conveying rollers 112.

A secondary transfer roller 113 held in contact with the outer surface of the transfer belt 125 is disposed at a position of the sheet conveyance path 111 facing the drive roller 125a. The sheet P being conveyed in the sheet conveyance path 111 has the toner image on the transfer belt 125 transferred thereto while being pressingly held between the transfer belt 125 and the secondary transfer roller 113.

A transfer belt cleaning device 127 for removing the toner residual on the outer surface of the transfer belt 125 is arranged at the right end of the transfer belt 125. The transfer belt 125 after the completion of a transfer process to the sheet P is turned for a next transfer process after being cleaned by having the residual toner on the outer surface thereof removed by the transfer belt cleaning device 127.

The fixing device 13 is for applying the fixing process to the toner image transferred to the sheet in the image forming assembly 12 and includes a fixing roller 131 having an electric heating element such as a halogen lamp as a heating source inside and a pressure roller 132 arranged to face the fixing roller 131 at the left side. The sheet P after the transfer process, which came from the image forming assembly 12 via the secondary transfer roller 113, is conveyed while being pressingly held between the fixing roller 131 and the pressure roller 132. At this time, the toner image is fixed to the sheet P by heat given from the fixing roller 131, whereby the stable color image is formed on the sheet.

The color printed sheet P after the completion of the fixing process is discharged to the internal discharge tray 151 provided in the apparatus main body 11 through a discharging conveyance path 114 extending from an upper part of the fixing device 13.

The sheet storage unit 14 includes a sheet tray 141 detachably mounted at a position below the exposure devices 124 in the apparatus main body 11. A sheet stack is stored in the sheet tray 141. Sheets P are dispensed one by one from the sheet stack stored in the sheet tray 141 by driving a pickup roller 142 and conveyed toward a nip portion between the secondary transfer roller 113 and the transfer belt 125 in the sheet conveyance path 111.

Next, the optical unit 20 (or image reader) arranged above the apparatus main body 11 constructed as above is described. The optical unit 20 includes an optical system comprised of optical components for irradiating a document (or target object) to be read with light and receiving the reflected light.

The optical unit 20 is provided with a box-shaped casing 30, a reading unit 40 (a part of the optical system) installed in the casing 30 in such a manner as to move back and forth in transverse directions and adapted to irradiate a document surface with light and receive the reflected light, and a lens/sensor unit 50 (a part of the optical system) for focusing the reflected light from the reading unit 40 to obtain an image data.

The casing 30 has a rectangular parallelepipedic shape so as to be accommodated in the image reader frame 16. A large rectangular opening is formed in a central part of the upper surface of the casing 30, and the contact glass 31 is fitted in this opening. The contact glass 31 is set in position so as to face an opening formed in the upper surface of the outer cover 160 with the optical unit 20 mounted in the image reader frame 16.

The reading unit 40 is a movable body that moves in the casing 30, and scans a document surface of a document placed on the contact glass 31 by moving rightward from a position (or home position) slightly to the right of the left end of the casing 30 and, thereafter, moves in a reverse direction to return to the home position.

The reading unit 40 includes a light source unit 41 for irradiating the document surface with light, and a mirror unit 42 for reflecting the reflection of the light from the light source unit 41 by the document surface to propagate along an optical path to introduce it to the lens/sensor unit 50.

The light source unit 41 includes a first scanning frame body 411 that is a transversely long frame body and reciprocates in transverse directions, a light source member 412 supported in the first scanning frame body 411 and elongated in forward and backward directions, and a first mirror 413 for reflecting the reflection of the light from the light source unit 412 by the document surface to left.

The light source member 412 is formed by arraying a plurality of unit LEDs (Light Emitting Diodes) 412 in a row in a specified frame. Rays of Light irradiated from the light source member 412 are reflected by a document surface of a document P1 via the contact glass 31. The light rays reflected by the document surface of the document P1 are introduced to the lens/sensor unit 50 via a plurality of mirrors 413, 412 and 421. The lens sensor unit 50 includes CCDs 51, which convert light signals into electrical signals and outputs them as image information to the image forming assembly 12.

Figure 3:
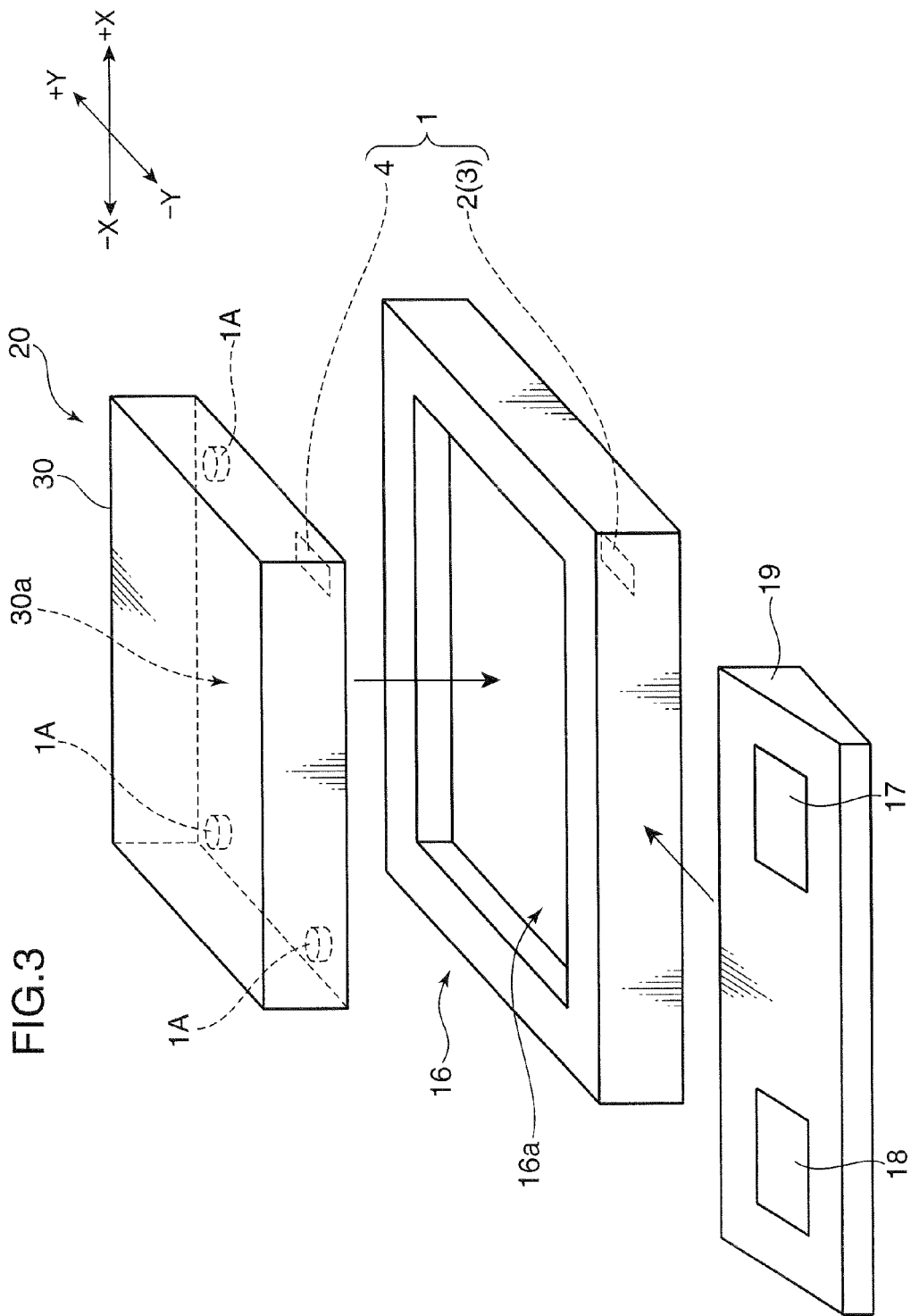
FIG. 3 is an exploded perspective view showing an image reader frame for accommodating a casing of an optical unit.

As shown in FIG. 3, a height adjusting mechanism 1 is provided near the right front one of four corners of the bottom surface of the casing 30 and leg portions 1A having a specified height are provided near the remaining three corners between the casing 30 of the optical unit 20 constructed as above and the image reader frame 16 (supporting frame) accommodating the optical unit 20. The casing 30 is supported by the three leg portions 1A and the height adjusting mechanism 1, and the height position thereof with respect to a bottom surface 16a of the image reader frame 16 is made adjustable by the height adjusting mechanism 1 at the right front position.

Figure 4:
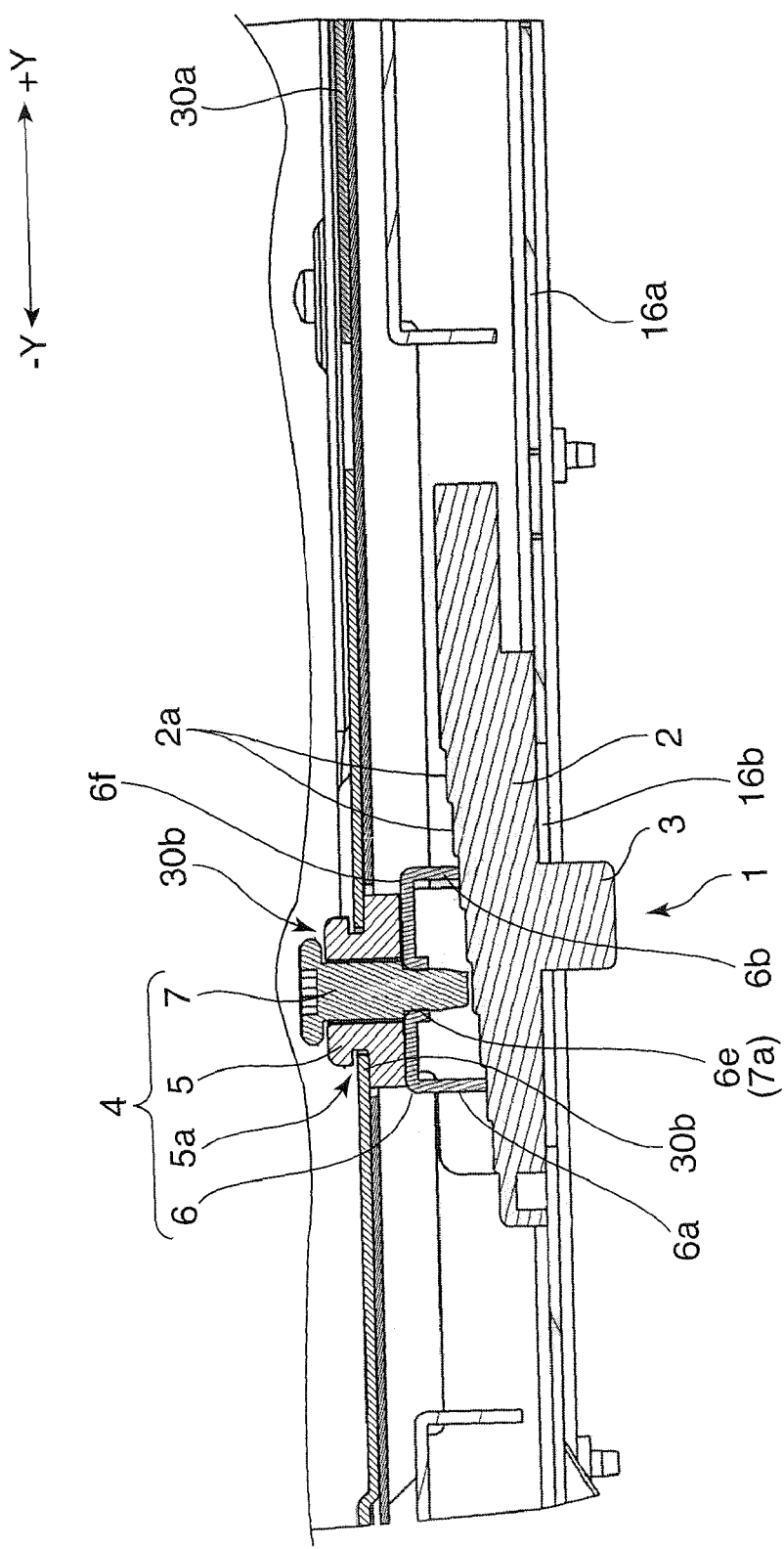
FIG. 4 is a section showing a construction of a height adjusting mechanism.
Figure 5:
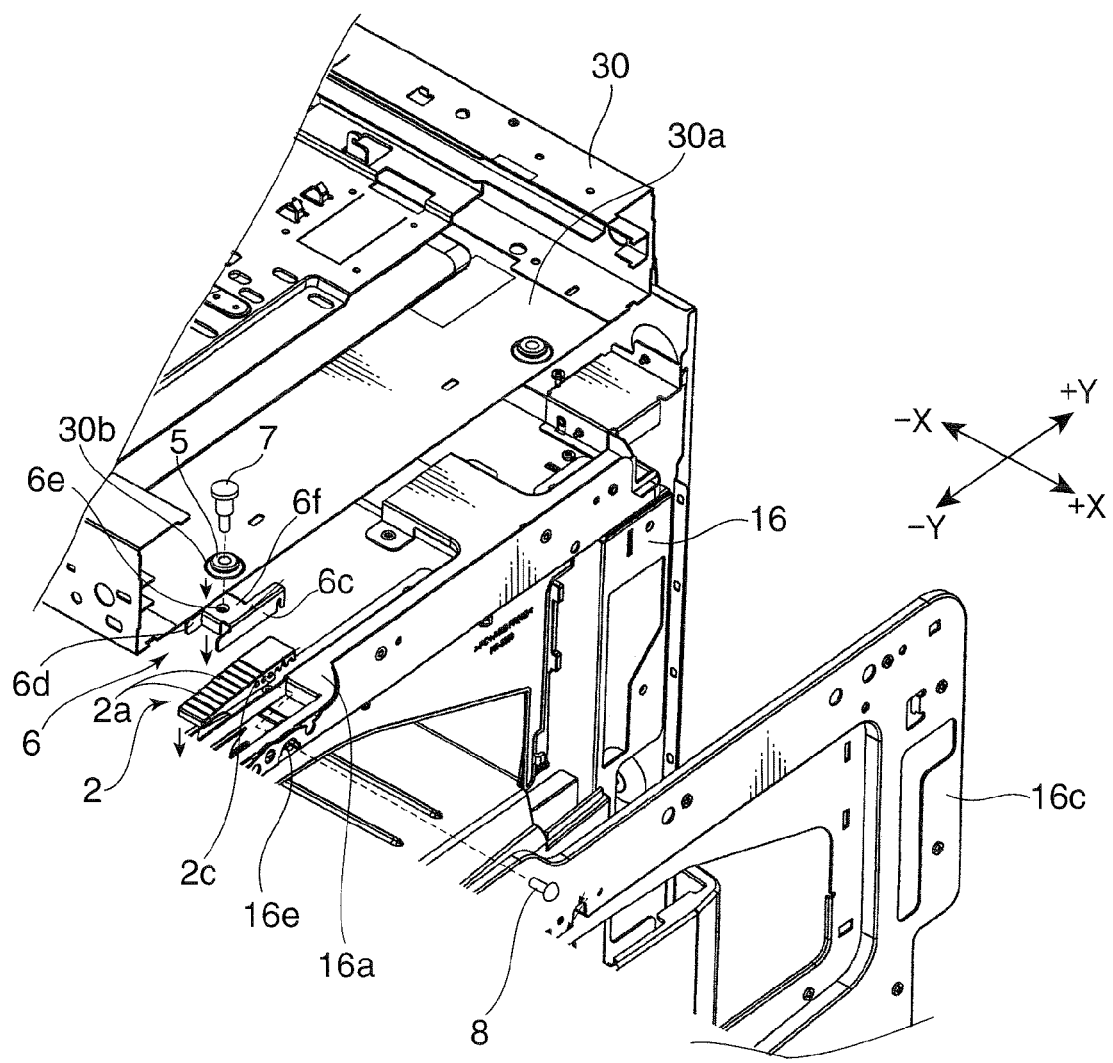
FIG. 5 is an exploded perspective view of the height adjusting mechanism.
Figure 6:
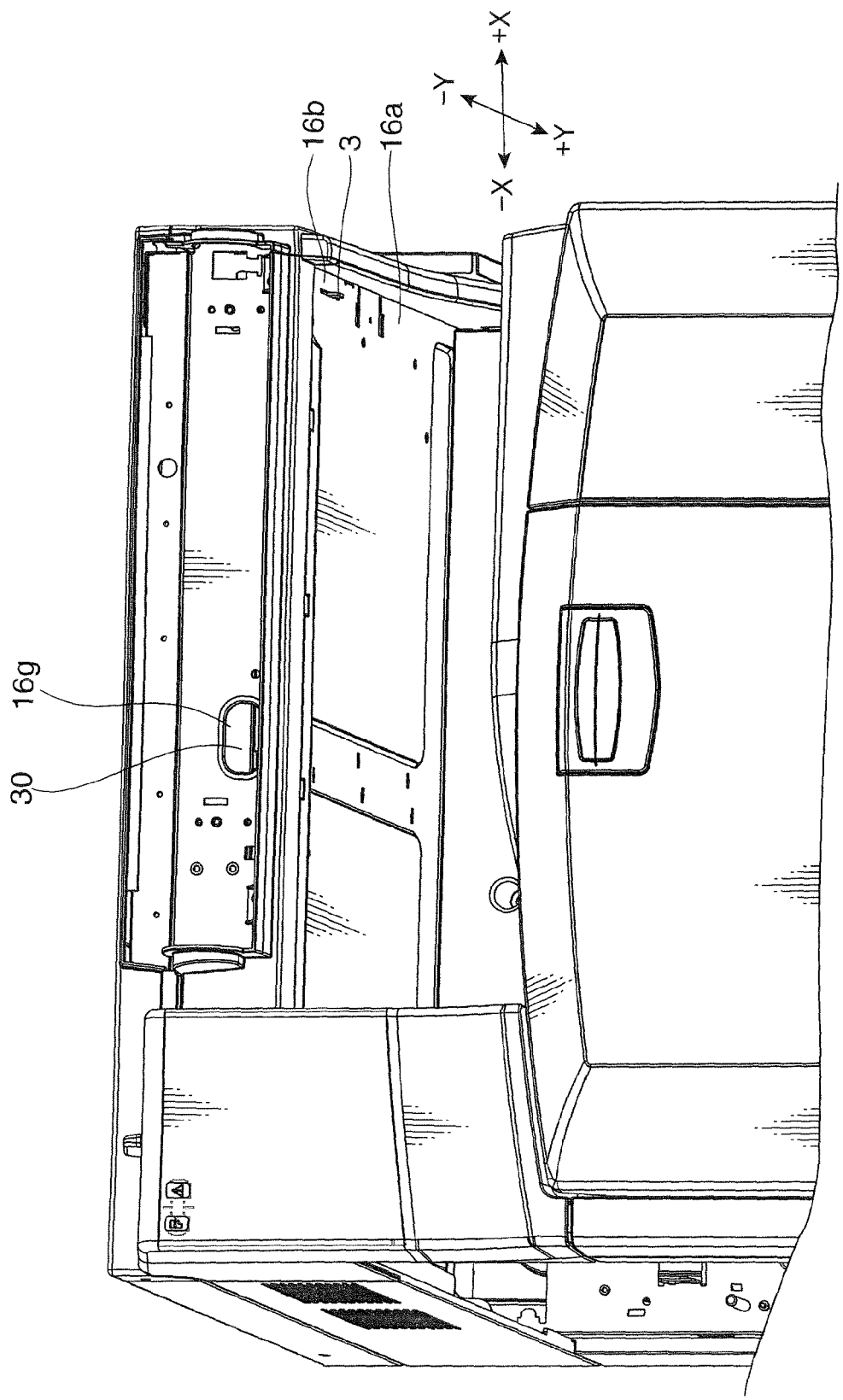
FIG. 6 is a side view of the image forming apparatus, showing an arrangement position of a grip of the height adjusting mechanism.
Figure 7:
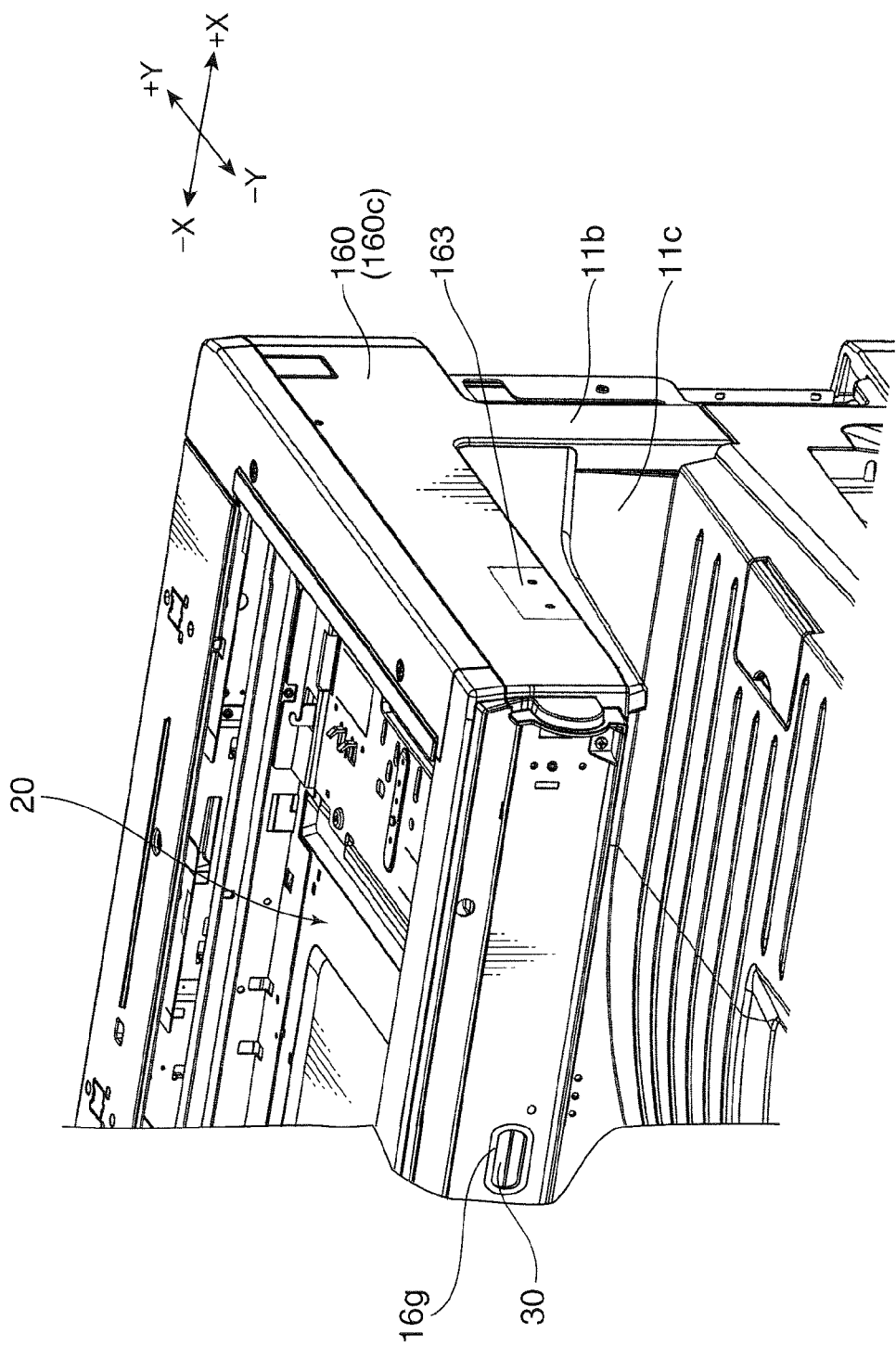
FIG. 7 is a perspective view showing an opening/closing member for covering a window portion formed in an outer cover.
Figure 8:
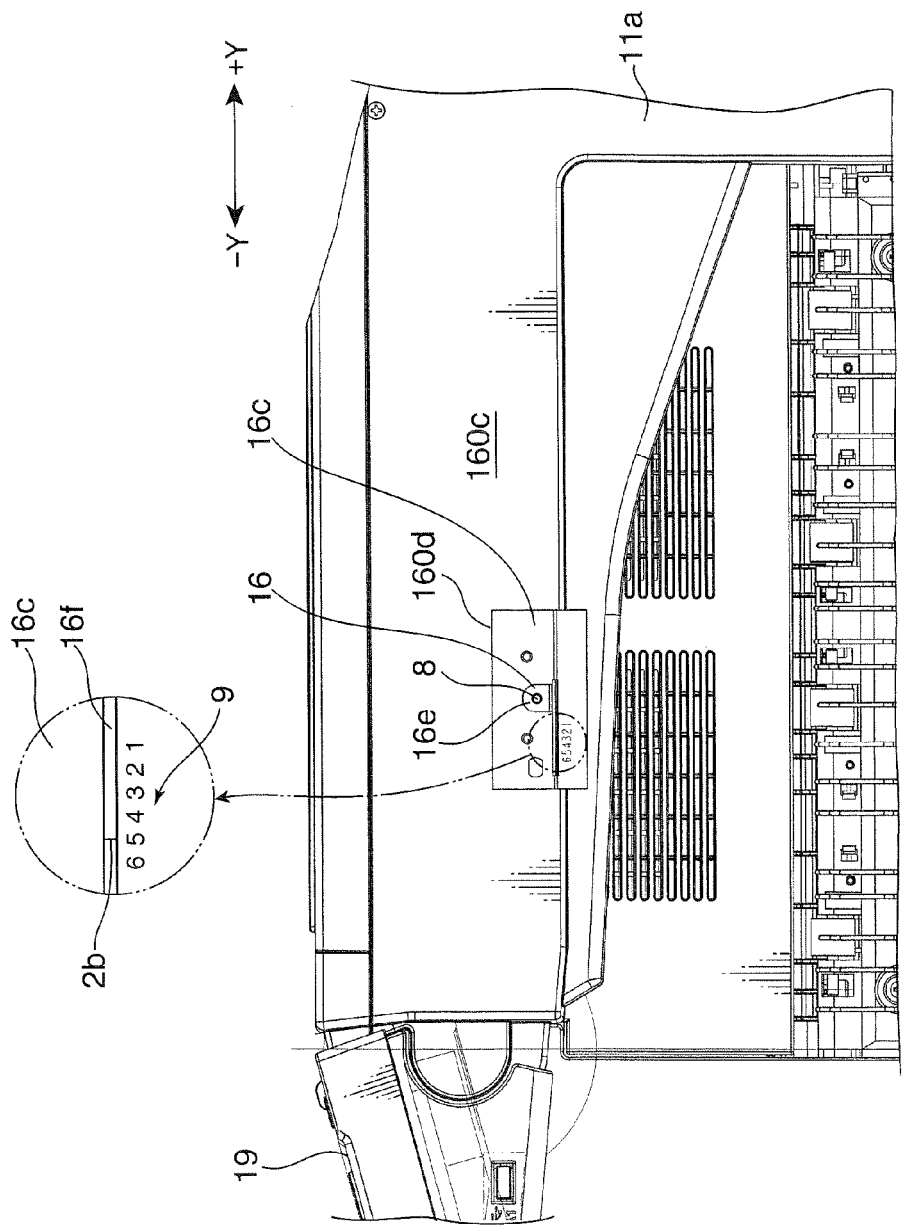
FIG. 8 is a right side view of the image forming apparatus.

FIG. 4 is a section of the height adjusting mechanism 1, FIG. 5 is an exploded perspective view of the height adjusting mechanism 1, FIG. 6 is a perspective view showing an arrangement position of a grip 3 of the height adjusting mechanism 1, FIG. 7 is a perspective view showing an opening/closing member for covering a window portion formed in the outer cover, and FIG. 8 is a right side view of the image forming apparatus 10 showing a state seen when the opening/closing member is open.

The height adjusting mechanism 1 includes a height adjusting member 2 having a plurality of upper surfaces 2a (or supporting surface; first supporting surface and second supporting surface) whose heights change stepwise, the grip 3 (or operable portion) formed to be integral to the height adjusting member 2, and a casing supporting member (or adjustable member) 4 supported on the upper surfaces 2a of the height adjusting member 2 and integrally mounted on a bottom surface 30a of the casing 30. In this embodiment, the height adjusting member 2 including the grip 3 is provided in the image reader frame 16 and the casing supporting member 4 is provided in the casing 30.

The bottom end of the grip 3 is exposed through an opening 16b formed in the bottom surface 16, and the grip 3 is slidable in forward and backward directions along the opening 16b. If a user gives a sliding force to the grip 3, the height adjusting member 2 can slide in forward and backward directions along the bottom surface 16a of the image reader frame 16.

In this embodiment, the upper surfaces 2a are ten supporting surfaces having different heights (steps between the respective supporting surfaces are constant) and formed stepwise in forward and backward directions (or sliding directions). This arrangement is only an example and it is sufficient for the height adjusting member 2 to have at least a first supporting surface set at a specified first height position and a second supporting surface set at a second height position different from the first height position. However, if there are many stepwise upper surfaces 2a that successively slightly change in height along the sliding direction of the height adjusting member 2 as in this embodiment, it is preferable since fine height adjustment can be made in accordance with a sliding movement of the height adjusting member 2.

Further, the height adjusting member 2 is so constructed as not to be slidable by attaching a screw 8 (or fixing member; see FIGS. 5 and 8). A window portion 160d is formed in a side plate 160c of the outer cover 160. The screw 8 can be attached to and detached from the image reader frame 16 through the window portion 160d.

Specifically, the screw 8 is threadably mounted into an internally threaded hole 16e formed in the image reader frame 16 while the head thereof is projecting. A plurality of (e.g., six in the number of slidable steps) holes 2c are formed in a side surface of the height adjusting member 2. The sliding movement of the height adjusting member 2 is prohibited by engaging one of the holes 2c with the leading end of the screw 8 projecting from the internally threaded hole 16e. In the case of sliding the height adjusting member 2, the screw 8 is detached. A part identified by 16c in FIGS. 5 and 8 is a side plate of the image reader frame 16 located at the inner side of the side plate 160c of the outer cover 160.

As shown in a partial enlarged view in a circle of FIG. 8, a mark 2b indicating a slide position of the height adjusting member 2 is provided on the side surface of the height adjusting member 2. The mark 2b is provided at a position seeable from the outside through a slit 16f formed in the side plate 16c of the image reader frame 16. If the mark 2b coincides with an indicator attached to the side plate 16c, e.g., any one of numbers in an indicator 9 having numbers of 1 to 6, a slide amount of the height adjusting member 2, i.e., the height position of the casing 30 with respect to the bottom surface 16a of the image reader frame 16 can be numerically understood. Here, the number 1 of the indicator 9 indicates the height position and the number 6 thereof indicates the lowest position.

The casing supporting member 4 includes a base member 5 mounted in a through hole 30b formed in the bottom surface 30a of the casing 30, a base member fixture 6 arranged on the height adjusting member 2 and a fixing pin 7 for fixing the base fixture 6 to the base member 5.

The base member fixture 6 includes uneven portions 6a, 6b spaced apart in forward and backward directions and placed on two upper surfaces 2a of the height adjusting member 2 having different heights, a pair of left and right restricting portions 6c, 6d for restricting transverse displacements of the height adjusting member 2 and a ceiling surface 6f formed with a internally threaded hole 6e into which an externally threaded portion 7a formed at the leading end portion of the fixing pin 7 is threadably mounted (see FIGS. 4 and 5). A difference between the height of the portion 6a and that of the portion 6b is set equal to four steps of the upper surfaces 2a in this embodiment, so that the ceiling surface 6f is substantially horizontally held.

The base member 5 is made of, e.g., rubber and has a substantially tubular shape, and an annular recessed groove 5a is formed in the outer circumferential surface thereof. The base member 5 is mounted on the bottom surface 30a of the casing 30 by fitting the inner edge of the through hole 30b into the annular recessed groove 5a. The base member fixture 6 is fixed to the base member 5 by means of the fixing pin 7.

The height adjusting mechanism 1 is provided at the right front of the bottom surface 30a as described above, and the right side plate 160c of the outer cover 160 is formed with the window portion 160d (see FIG. 8) and the opening/closing member 163 (see FIG. 7) for opening and closing this window portion 160d. If the window portion 160d is open, the screw 8 for fixing the height adjusting member 2 can be attached and detached and the indicator 9 and the mark 2b indicating the slide position of the height adjusting member 2 appear.

The height of the height adjusting mechanism 1 is adjusted, for example, in the case where the casing 30 of the optical unit 20 is inclined with respect to the contact glass 31 on which a document is to be placed. The height adjusting mechanism 1 is operated as follows.

First, an operator detaches the opening/closing member 163 and detaches the screw 8 from the window portion 160d, thereby making the height adjusting member 2 slidable.

Subsequently, the operation unit 19 is separated from the image reader frame 16 and the outer cover 160 to expose a part of the image reader frame 16. FIG. 6 shows this exposed state. The operator inserts his finger into a lifting opening 16g (or lifting mechanism), which has appeared in such an exposed part, to slightly lift up the front of the casing 30 of the optical unit 20. At this time, the rear of the casing 30 is supported on the two leg portions 1A at the rear, and the supported state of the casing 30 on the image reader frame 16 is substantially maintained. In this state, the operator slides the grip 3 in a desired one of forward and backward directions to adjust the height position of the casing supporting member 4. Thereafter, the operator lowers the front of the casing 30 having been lifted up through the opening 16g.

Thereafter, the number at the position of the mark 2b is confirmed. If a desired number is confirmed and there is no need for readjustment, the operator attaches the screw 8 through the window portion 160d to prohibit the sliding movement of the height adjusting member 2, and closes the window portion 160d by mounting the opening/closing member 163. Further, the operation unit 19 is mounted on the image reader frame 16 and the outer cover 160.

As described above, in the first embodiment, the height position of the casing supporting member 4 is adjusted by sliding the height adjusting member 2 in a desired direction while holding the grip 3. By adjusting the height position of the casing supporting member 4, the height of the bottom surface 30*a* of the casing 30 with respect to the bottom surface 16*a* of the image reader frame 16 can be changed. Thus, the displacement of the optical unit 20 with respect to the image reader frame 16 can be adjusted.

The grip 3 used to make such an adjustment can be operated from the outside of the image reader frame 16. Accordingly, a displacement of the optical unit 20 with respect to the image reader frame 16 can be adjusted while the supported state of the casing 30 on the image reader frame 16 is substantially maintained without disassembling the image reader frame 16 not only upon assembling the optical unit 20 into the image reader frame 16, but also after the optical unit 20 is assembled into the image reader frame 16.

In the first embodiment, the height adjusting member 2 cannot be slid and the grip 3 exposed outside the image reader frame 16 cannot be moved unless the opening/closing member 163 is opened and the screw 8 (or fixing member) is detached, an erroneous operation can be prevented. Further, the slide position of the height adjusting member 2 can be seen by opening the opening/closing member 163.

The first embodiment of the present invention has been described above, but the present invention is not limited to the above embodiment. For example, the following modifications (1) to (4) may be made.

(1) In the above embodiment, the grip 3 projects downward from the bottom surface 16*a* of the image reader frame 16. Without being limited to this, the grip 3 may be mounted on the side surface of the height adjusting member 2 and project laterally outward from the side surface of the image reader frame 16.

(2) Although the grip 3 and the height adjusting member 2 are slid in forward and backward directions in the above embodiment, they may be slid in transverse directions.

(3) Although the height adjusting mechanism 1 is provided at the right front out of the four corners of the optical unit 20 in the above embodiment, this is only an example. For example, the height adjusting mechanism 1 may be provided at least one of the four corners, i.e., at two, three or four positions. The leg portions 1A having the specified height are provided near the remaining corners where no height adjusting mechanism 1 is arranged.

(4) In the above embodiment, the present invention is applied to the image reader of the copier in which the apparatus main body 11 is provided below the image reader. Besides, the present invention is similarly applicable to image readers of printers and facsimile machines which are also used as copiers and in which printer main bodies and facsimile main bodies are provided below the image readers, is also similarly applicable to image readers separate from copier main bodies, printer main bodies and facsimile main bodies and is further similarly applicable to optical unit assemblies in general including an optical system comprised of optical components for irradiating a target object with light and receiving the reflected light.

Second Embodiment

Figure 9:
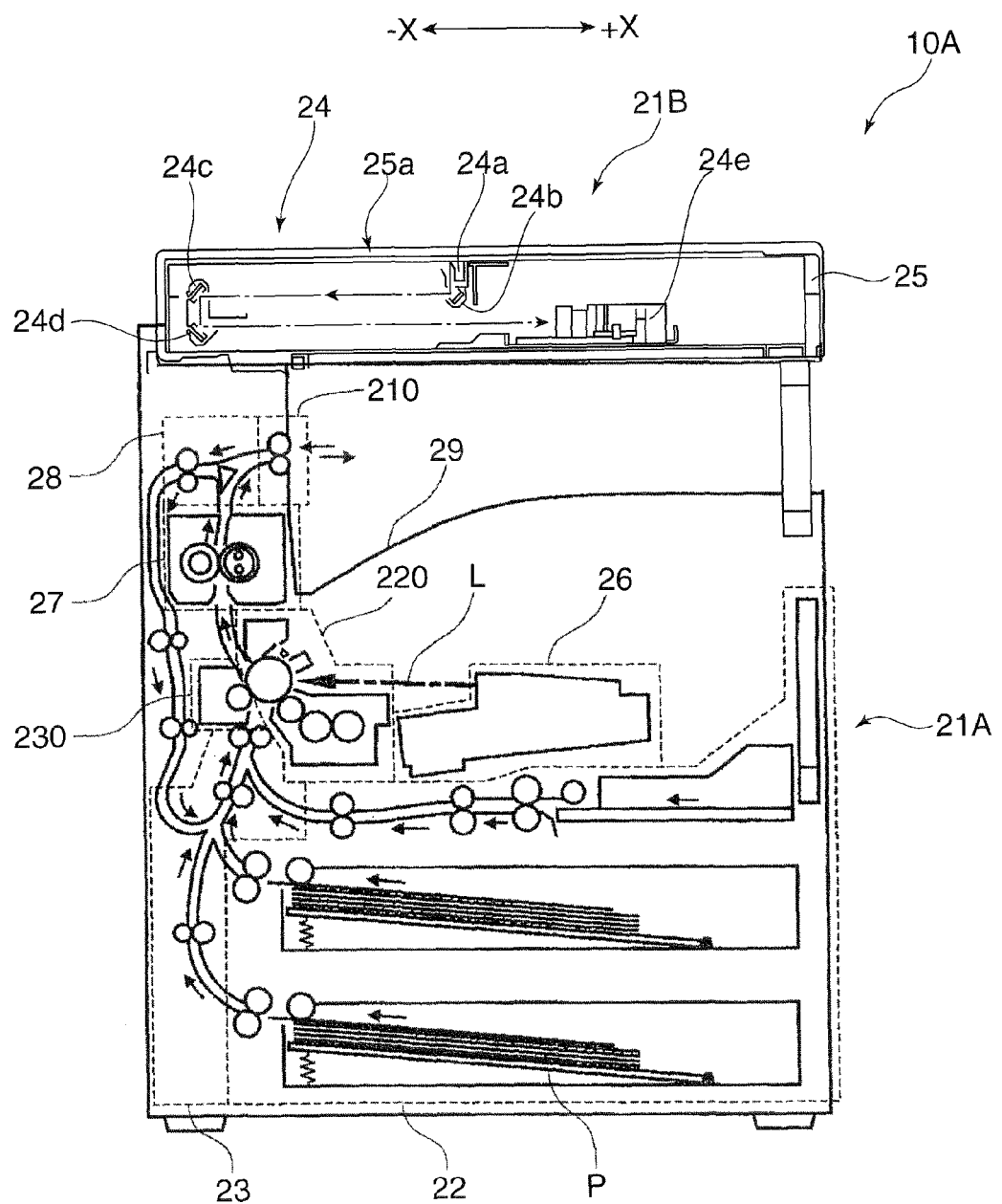
FIG. 9 is a front view schematically showing an image forming apparatus according to a second embodiment of the invention.

Next, an image forming apparatus 10A according to a second embodiment of the present invention is described. In the second embodiment, a black-and-white copier is illustrated as the image forming apparatus 10A. FIG. 9 is a front view in section schematically showing the image forming apparatus 10A according to the second embodiment. Solid-line arrows in FIG. 9 indicate sheet conveyance paths and sheet conveying directions, and dashed-dotted line arrows indicate a laser beam L. Indications of directions X, Y in FIG. 9 and the following figures are similar to the case of FIGS. 1 to 8.

The image forming apparatus 10A is provided with an image forming apparatus main body 21A having a housing structure in its lower part and an image reading station 21B similarly having a housing structure in its upper part and is basically constructed such that a toner image is formed by the image forming apparatus main body 21A based on an image data read by the image reading station 21B and the toner image is transferred to a sheet P.

The image forming apparatus main body 21A includes a sheet storage unit 22 in its bottom part, stacks of sheets P such as cut paper sheets before printing are accommodated in the sheet storage unit 22, and the sheets P are separated one by one from these sheet stacks to be fed.

A sheet conveyance path 23 is provided to the left of the sheet storage unit 22 in the image forming apparatus main body 21A. The sheet P fed from the sheet storage unit 22 is conveyed vertically upward along a side surface of the image forming apparatus 10A by the sheet conveyance path 23 to reach a transfer device 230 to be described later.

On the other hand, an optical unit 24 for reading an image data of a document placed on a document placement surface formed on the upper surface of the image reading station 21B is built in the image reading station 21B provided above the image forming apparatus main body 21A. This optical unit 24 includes a light source 24*a*, a plurality of, e.g., three mirrors 24*b*, 24*c* and 24*d* for changing a propagation direction of the light emitted from the light source 24*a* and reflected by the document, and CCDs 24*e* for reading the image data of the document via these mirrors 24*b*, 24*c* and 24*d*.

The information of the image data read by the image reading station 21B is sent to a laser emitter 26 disposed in the center of the image forming apparatus main body 21A above the sheet storage unit 22. The laser emitter 26 emits a laser beam L controlled based on the image data toward an image forming assembly 220 to be described later.

The image forming assembly 220 and the transfer device 230 are provided above the sheet conveyance path 23 and to the left of the laser emitter 26. In the image forming assembly 220, an electrostatic latent image of the document image is formed by the laser beam L emitted by the laser emitter 26. A toner image is formed from this electrostatic latent image and transferred to a sheet P before printing conveyed in synchronism by the sheet conveyance path 23 in the transfer device 230.

A fixing device 27 is provided above the transfer device 230. The sheet P bearing the toner image, which is not fixed yet, in the transfer device 230 is fed to the fixing device 27, and the toner image is heated and fused to be fixed by a heat roller.

A branch portion 28 is provided above the transfer device 230. The sheet P discharged from the fixing device 27 is discharged to a sheet discharge tray 29 provided in the image forming apparatus 10A from the branch portion 28 in the case of performing no duplex printing.

A discharge port through which the sheet P is discharged from the branch portion 28 to the sheet discharge tray 29 functions as a switch-back portion 210. In the case of performing duplex printing, the conveying direction of the sheet P discharged from the fixing device 27 is switched. Then, the sheet P is conveyed downward at the left side of the fixing device 27 and the transfer portion 230 and conveyed to the transfer device 230 via the sheet conveyance path 23 again.

Figure 10:
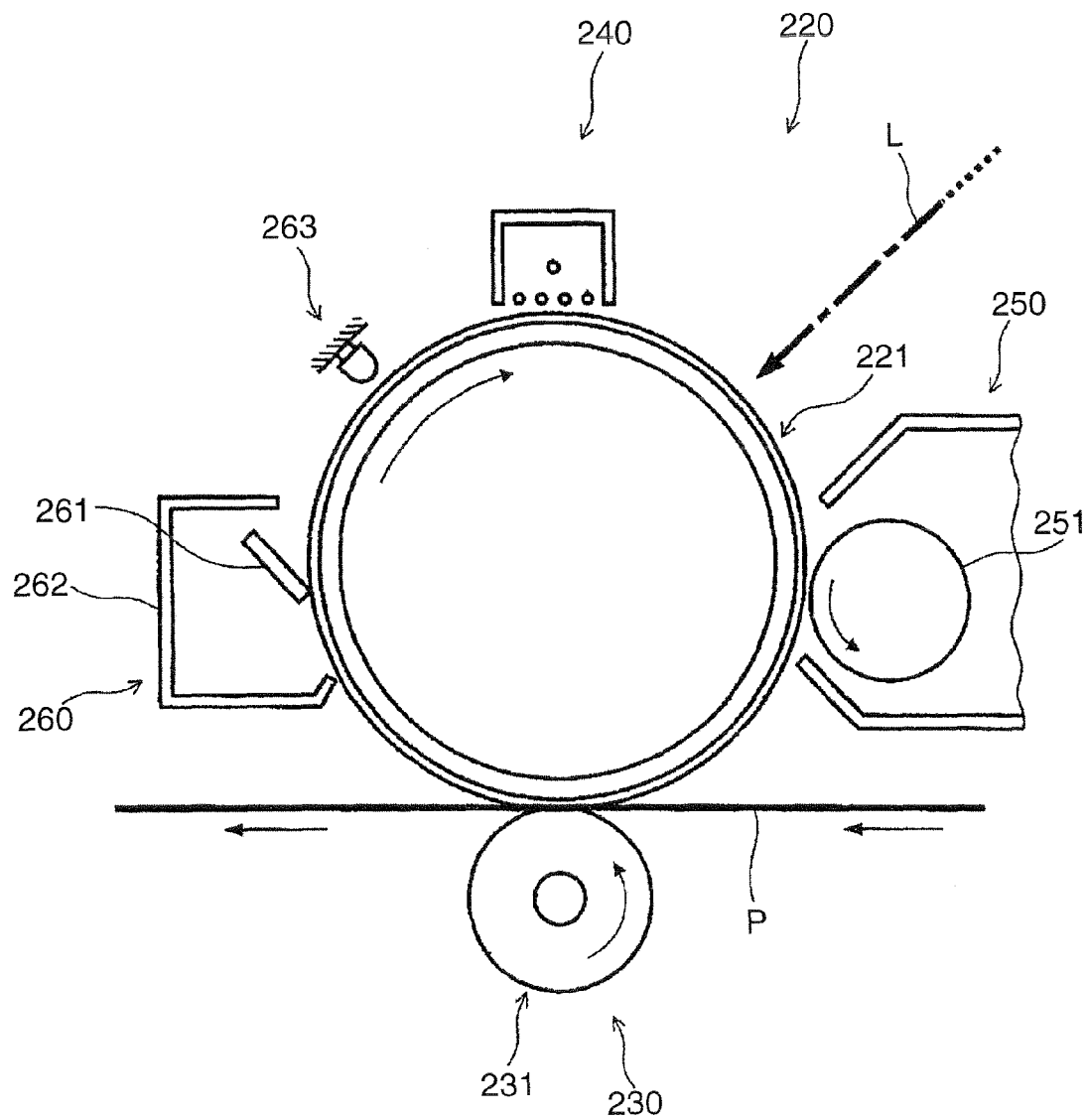
FIG. 10 is a detailed diagram showing an image forming assembly and its periphery.

FIG. 10 is a detailed diagram showing the image forming assembly 220 and its periphery. FIG. 10 is drawn so that the sheet conveying direction is a horizontal direction, and does not show parts that need not be described.

The image forming assembly 220 includes a photoconductive drum 221 as an image bearing member in its center. A charger 240, a developing device 250, a cleaning device 260 and a charge neutralizer 263 are arranged in this order around and in the vicinity of the photoconductive drum 221 along a rotating direction of the photoconductive drum 221.

The photoconductive drum 221 has the outer surface thereof uniformly charged by the charger 240 to have specified polarity and potential. The charged photoconductive drum 221 is irradiated with the laser beam L controlled by the laser emitter 26 based on the image data read by the image reading station 21B, whereby the potential in an irradiated part is optically attenuated to form an electrostatic latent image of the document image. The toner charged in the developing device 250 is supplied to the outer surface of the photoconductive drum 221 by a developing roller 251, thereby forming a toner image from the electrostatic latent image.

On the other hand, the sheet P is inserted into a transfer nip portion formed by the contact of the photoconductive drum 221 and the transfer roller 231 by the sheet conveyance path 23 (see FIG. 9) in synchronism with the toner image formation on the outer surface of the photoconductive drum 221. At this time, a negative transfer bias having a polarity opposite to that of the photoconductive drum 221 and the toner is applied to the transfer roller 231. In this way, the toner is transferred from the photoconductive drum 221 toward the transfer roller 231 and the toner image is contact-transferred to the sheet P.

After the toner image transfer, the toner residual on the outer surface of the photoconductive drum 221 is scraped off by a cleaning blade 261 provided in the cleaning device 260 to be removed. The toner collected into a housing 262 provided in the cleaning device 260 is conveyed to the outside of the cleaning device 260 by a screw (not shown). After the toner on the outer surface of the photoconductive drum 221 is cleaned, electric charges on the outer surface of the photoconductive drum 221 are neutralized by the charge neutralizer 263, thereby preparing for a next image forming operation.

Figure 11:
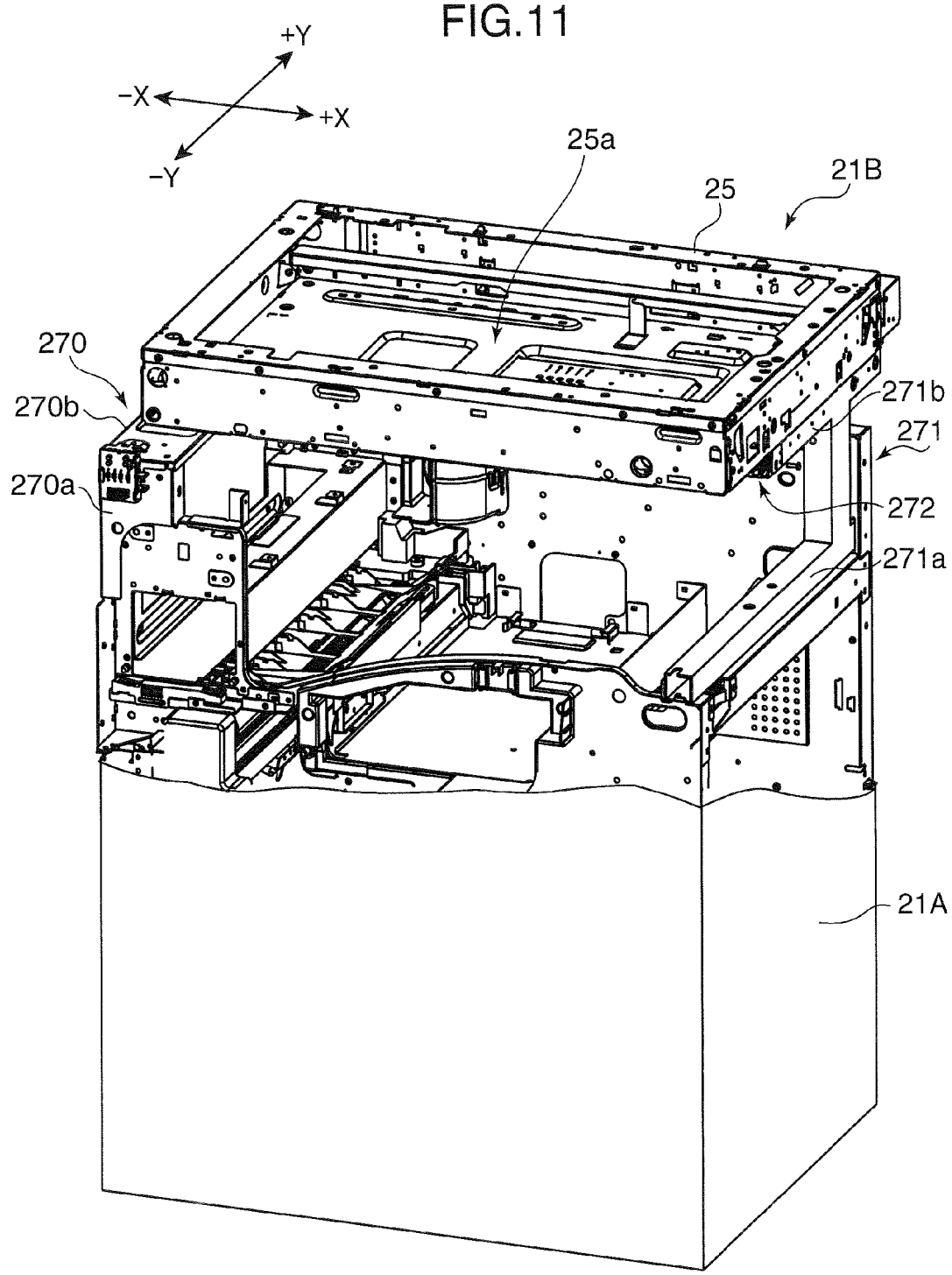
FIG. 11 is a perspective view showing a supporting structure for an image reader by an image forming apparatus main body.
Figure 12:
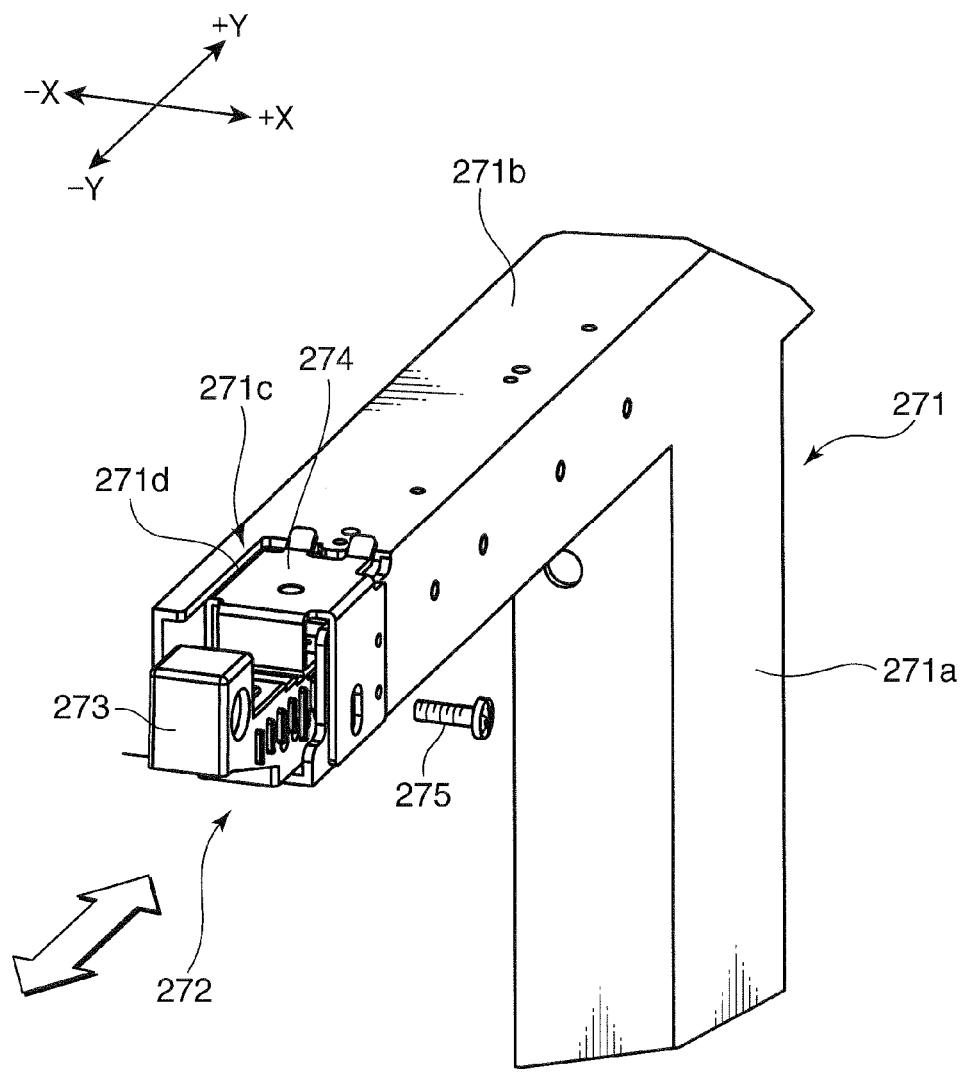
FIG. 12 is a perspective view showing a height adjusting mechanism provided in the supporting structure of FIG. 11.
Figure 13:
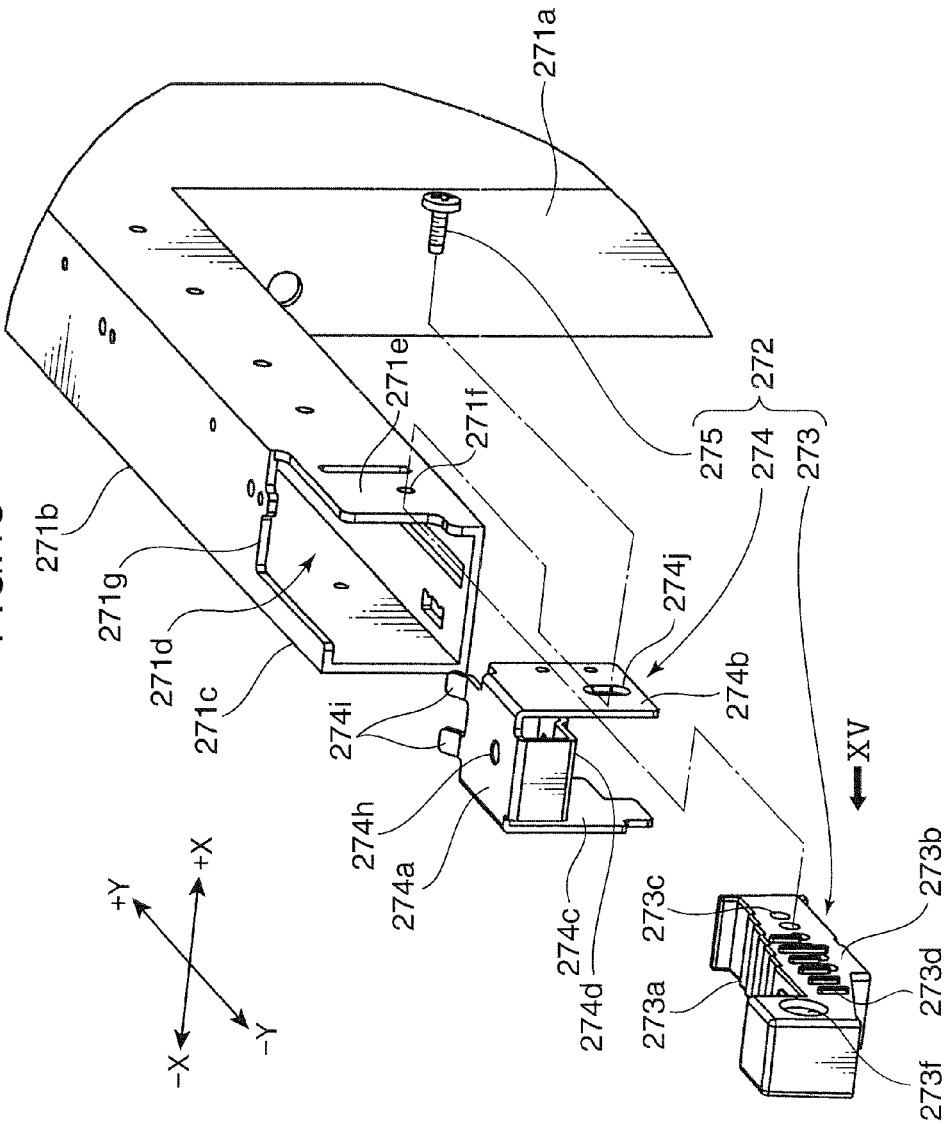
FIG. 13 is an exploded perspective view showing the height adjusting mechanism of FIG. 12.
Figure 14:
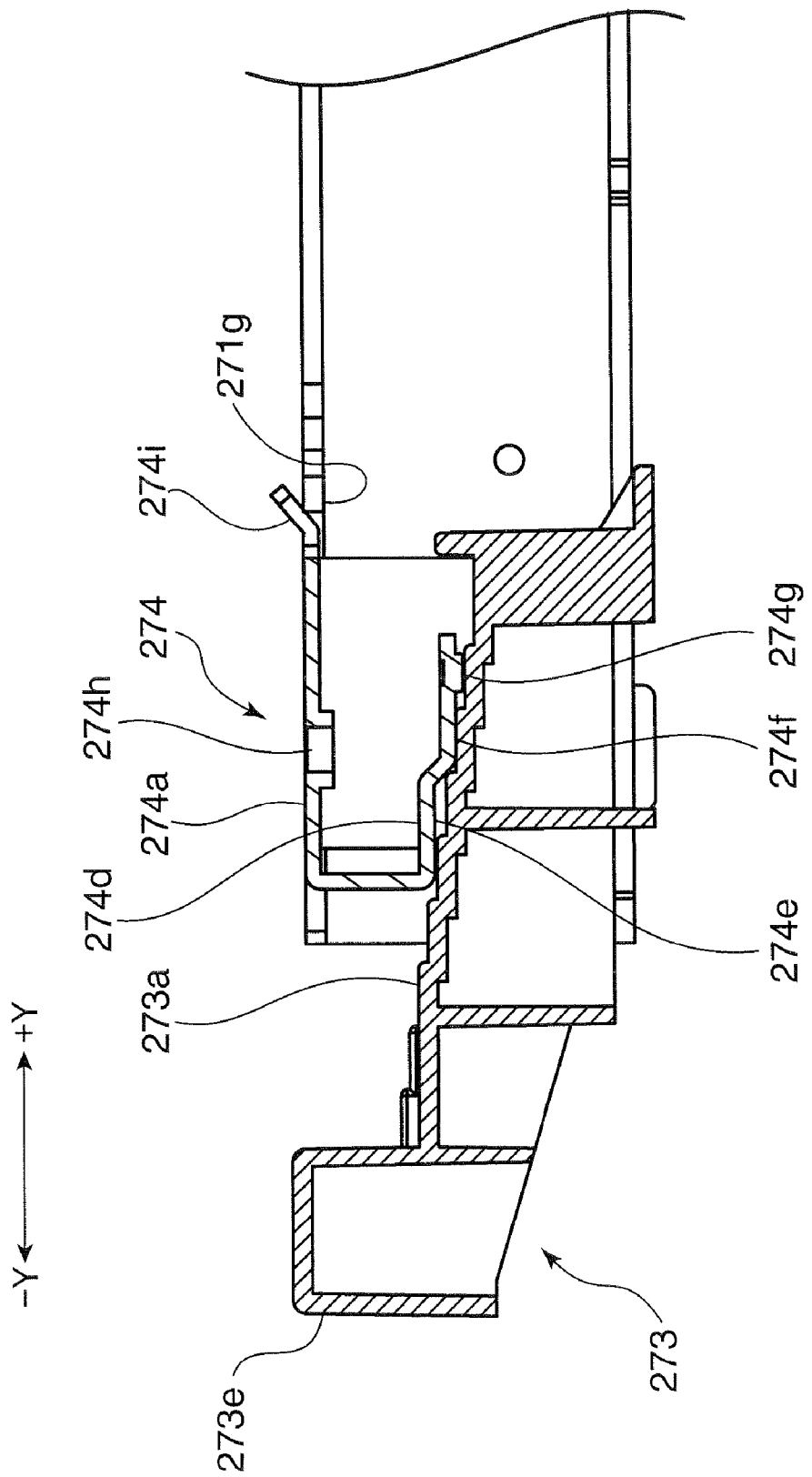
FIG. 14 is a section of the height adjusting mechanism.

FIG. 11 is a perspective view showing a supporting structure for the image reading station 21B by the image forming apparatus main body 21A, FIG. 12 is a perspective view showing a height adjusting mechanism provided in the supporting structure, FIG. 13 is an exploded perspective view of the height adjusting mechanism, and FIG. 14 is a section of the height adjusting mechanism.

The image forming apparatus main body 21A has the supporting structure including a supporting portion 270 at a left upper and a supporting frame 271 at a right upper. The supporting portion 270 is such that the upper ends of struts 270a (rear strut is not shown in FIG. 11) at front and rear are bridged by a horizontal frame portion 270b. On the other hand, the supporting frame 271 is formed by working a rectangular pipe such that a horizontal frame portion 271b is placed atop an L-shaped lower frame portion 271a.

The image reading station 21B is constructed such that the optical unit 24 is enclosed by a rectangular parallelepipedic casing 25 having an opening 25a formed in the upper surface. The left side of the bottom surface of the casing 25 is supported from below by the supporting portion 270, and the right side of the bottom surface of the casing 25 is supported from below by the supporting frame 271. It should be noted that an unillustrated outer cover is mounted on the outside of the casing 25.

Here, the right front of the bottom surface of the casing 25 is supported by the height adjusting mechanism 272 so that the height can be adjusted. This height adjusting mechanism 272 is provided on a front end portion 271c of the horizontal frame portion 271b. A cutout 271d is formed in the upper surface of the frame end portion 271c.

The height adjusting mechanism 272 includes an adjusting member 273 slidably provided in the horizontal frame portion 271b along the longitudinal direction (horizontal forward and backward directions) of the horizontal frame portion 271b, an adjustable member 274 fixed to the bottom surface of the casing 25 and disposed above the adjusting member 273, and a positioning screw 275 for preventing the adjusting member 273 and the adjustable member 274 from moving in forward and backward directions with respect to the front end portion 271c.

FIGS. 15A and 15B are a right side view (view seen in a direction of arrow XV of FIG. 13) and a front view showing the adjusting member 273.

The adjusting member 273 has a stepped upper surface 273a (or supporting surface; first and second supporting surfaces). In this embodiment, the upper surface 273a is comprised of nine supporting surfaces having different heights and arranged stepwise in forward and backward directions (or sliding directions). The stepped upper surface 273a is formed such that the respective steps have substantially constant heights and the front side is lower than the rear side.

A right side surface 273b of the adjusting member 273 is formed with six positioning screw holes 273c and six vertically long projections 273d. The numbers of the screw holes 273c and the projections 273d are arbitrary. A front portion of the adjusting member 273 serves as a grip 273e to be gripped by an operator upon performing a sliding operation. The grip 273e is formed with a hole 273f so as to be easily grippable by an operator. Instead of the hole 273f, an uneven grip may be provided. The projections 273d are used to make a slide position confirmable by the eyes based on a positional relationship with the front end of the right side surface of the front end portion 271c.

The adjustable member 274 includes an upper portion 274a to be attached to the bottom surface of the casing 25, right and left hanging portions 274b, 274c hanging down from the left and right ends of the upper portion 274a to hold the adjusting member 273 therebetween in a width direction, and a lower surface 274d hanging down from the front end of the upper portion 274a and then bent to extend backward (see FIG. 13).

The lower surface 274d is formed with three height parts 274e, 274f and 274g having different heights (see FIG. 14). The foremost one of these height parts 274e, 274f and 274g is highest, the rearmost one thereof is lowest and the intermediate height part 274f has an intermediate height level. In other words, the lower surface 274d is formed to have a stepped shape opposite to that of the upper surface 273a of the adjusting member 273. The upper portion 274a is formed with an internally threaded hole 274h for a screw (not shown) threadably mounted through the bottom surface of the casing 25, and stoppers 274i are provided at the rear thereof.

As shown in FIG. 14, at the front end portion 271c of the horizontal frame 271b, the adjusting member 273 is arranged in a lower portion and the adjustable member 274 is arranged above the adjusting member 273. At this time, the right hanging portion 274b is so arranged as to be located outer than a right side wall 271e of the cutout 271d in the horizontal frame 271b (see FIG. 12).

In the case of adjusting the height of the casing 25, an operator slides the grip 273e of the adjusting member 273 forward or backward by holding the grip 273e while slightly lifting the front of the casing 25. At this time, the supported state of the casing 25 by the adjusting member 273 is released, but the rear of the casing 25 is supported by the supporting portion 270 and the supporting frame 271, and the supported state of the casing 25 by these is substantially maintained.

By a sliding movement of the adjusting member 273, the contact portions of the height parts 274e, 274f and 274g on the lower surface 274d of the adjustable member 274 with three positions of the stepped upper surface 273a of the adjusting member 273 change. This enables the height position of the adjustable member 274 to be changed. Thereafter, the operator lowers the lifted front of the casing 25.

When the bottom surface of the casing 25 becomes horizontal, the positioning screw 275 is mounted from the right side toward the left side as shown in FIGS. 12 and 13. At this time, the positioning screw 275 is inserted through an oblong hole 274j formed in the right hanging portion 274b and a through hole 271f formed in the right side wall 271e of the horizontal frame portion 271b to be threadably engaged with one of the screw holes 273c, and the stoppers 274i are engaged with a rear edge 271g of the cutout 271d. The adjustable member 274 and the casing 25 having the adjustable member 274 secured to the bottom surface thereof are designed not to be lower than a specified height position by the engagement of these stoppers 274i and the location of the right hanging portion 274b outer than the right side wall 271e of the cutout 271d of the horizontal frame portion 271b.

According to the thus constructed image forming apparatus 10A of the second embodiment, a relative position of the adjusting member 273 with respect to the adjustable member 274 at a lower portion of the image reading station 21B changes if the adjusting member 273 is horizontally slid in forward and backward directions. Accordingly, the position of the stepped upper surface 273a of the adjusting member 273 supporting the adjustable member 274 changes to adjust the height of the adjustable member 274. Thus, the height of the casing 25 of the image reading station 21B having the adjustable member 274 attached to the bottom surface thereof can be adjusted. Therefore, even after the optical unit 24 is assembled into the image reading station 21B, the inclination of the optical unit 24 can be adjusted with the supported state of the casing 25 by the supporting portion 270 and the supporting frame 271 substantially maintained without disassembling the optical unit 24 from the image reading station 21B.

Further, in this embodiment, the lower surface 274d of the adjustable member 274 and the upper surface 273a of the adjusting member 273 have opposite stepped shapes in the sliding directions of the adjusting member 273 (or forward and backward directions). Thus, the adjustable member 274 and the adjusting member 273 have a plurality of contact surfaces: three contact surfaces in this embodiment. Therefore, the supported state of the adjustable member 274 by the adjusting member 273 can be more stable as compared to the case where there is only one contact surface.

The present invention is not limited to the second embodiment described above. For example, the following modifications (1) to (3) can be made.

(1) In the above embodiment, the supporting frame 271 includes the L-shaped lower frame portion 271a below the horizontal frame portion 271b. A member below the horizontal frame portion 271b may have any shape without being limited to the above. Further, it is not necessary to entirely form the horizontal frame portion 271b of the rectangular pipe, and a frame member that is hollow at an arrangement position of the height adjusting mechanism 272 may be used.

(2) In the above embodiment, the right side part of the casing 25 is supported by the entire upper surface of the horizontal frame portion 271b. Thus, the adjustable member 274 and the casing 25 are so designed as not to be lower than the specified height position, and the casing 25 is leveled by lifting the right front part of the casing 25 supported by the adjustable member 274. Instead, projections may be provided at a plurality of positions of the upper surface of the horizontal frame portion 271b and the right side part of the casing 25 may be supported by these projections and the height adjusting mechanism 272. In this case, the casing 25 can be leveled by both an upward movement of the right front part of the casing 25 and a downward movement of the casing 25, wherefore inclination adjustments in a wide range can be dealt with.

(3) Although one height adjusting mechanism 272 is provided at the right front in the above embodiment, the present invention is not limited thereto. For example, the height adjusting mechanism 272 may be provided at an arbitrary one of four right front, right rear, left front and left rear positions or may be provided at two or more of these four positions.

The specific embodiments described above mainly embrace inventions having the following constructions.

An optical unit assembly according to one aspect of the present invention comprises an optical system including an optical component for irradiating a target object with light and receiving the reflected light; a casing for accommodating the optical system; a supporting frame for supporting a part of the casing; and a height adjusting member having a supporting surface for supporting another part of the casing and placed between the supporting frame and the casing, wherein the height adjusting mechanism is slidable between the supporting frame and the casing in a supported state that the casing is substantially supported by the supporting frame; and the supporting surface includes at least a first supporting surface set at a specified first height position and a second supporting surface set at a second height position different from the first height position.

According to this construction, the height of the casing can be adjusted by sliding the height adjusting member in the supported state that the casing is substantially supported by the supporting frame.

In the above construction, the height adjusting member may preferably include an operable portion operable from the outside with the height adjusting member assembled between the supporting frame and the casing.

According to this construction, the height adjusting member can be easily slid from the outside by operating the operable portion.

In the above construction, it may be preferable that a lifting mechanism for permitting the casing to be slightly lifted is further provided; and that the slightly lifted state is attained by supporting a part of the casing by means of the supporting frame while releasing the support of another part of the casing by the supporting surface of the height adjusting member.

According to this construction, the supported state of the casing by the height adjusting member can be easily released to make the height adjusting member slidable.

In the above construction, it may be preferable that an adjustable member to be attached to the bottom surface of the casing is further provided; that the supporting surface of the height adjusting member has a stepped shape along a sliding direction of the height adjusting member; and that the adjustable member is supported by the stepped supporting surface.

In this case, the lower surface of the adjustable member may be preferably formed to have a stepped shape opposite to that of the stepped supporting surface of the height adjusting member along the sliding direction of the height adjusting member.

An image reader according to another aspect of the present invention comprises an optical system including an optical component for irradiating a document to be read with light and receiving the reflected light; a casing for accommodating the optical system; a frame adapted to accommodate the casing and having a bottom surface portion for supporting a part of the bottom surface of the casing; a casing supporting member to be attached to the bottom surface of the casing; a height adjusting member attached to the bottom surface portion of the frame in such a manner as to be slidable in a horizontal direction and having a supporting surface for supporting another part of the bottom surface of the casing; and a grip secured to the height adjusting member for giving a moving force to slide the height adjusting member along the bottom surface portion of the frame, wherein the supporting surface of the height adjusting member includes at least a first supporting surface set at a specified first height position and a second supporting surface set at a second height position different from the first height position; the casing supporting member is supported by the supporting surface of the height adjusting member and has the height position thereof adjusted by being supported by the first or second supporting surface as the height adjusting member is slid; and the grip projects outward of the frame so as to be operable from the outside of the frame.

According to this construction, an operator can change the height of the casing supporting member by sliding the height adjusting member in a desired direction while holding the grip. The height of the bottom surface of the casing with respect to the bottom surface of the frame can be changed by adjusting the height position of the casing supporting member. Thus, the displacement of the casing with respect to the frame can be adjusted. Further, since the grip used to make such an adjustment can be operated from the outside of the frame, the displacement of the casing with respect to the frame can be adjusted not only upon assembling the casing into the frame, but also after this assembling.

In the above construction, the supporting surface of the height adjusting member may be preferably formed to have a stepped shape along a sliding direction thereof.

In the above construction, it may be preferable that the supporting surface is stepped by having a multitude of supporting surfaces at different heights with height differences of adjacent supporting surfaces being constant; and that the casing supporting member includes uneven portions that come into contact with two supporting surfaces having different heights. According to this construction, the casing supporting member can be stably held in contact with the stepped supporting surface.

In the above construction, it may be preferable that a fixing member for fixing the height adjusting member to the frame is further provided; and that the height adjusting member is fixed to the frame by attaching the fixing member while being made slidable by detaching the fixing member. According to this construction, an erroneous operation of the height adjusting member can be prevented since the height adjusting member cannot be slid unless the fixing member is detached.

In this case, it may be preferable that the frame is formed with a window portion; and that the fixing member is attachable or detachable through the window portion. According to this construction, the fixing member can be easily attached or detached through the window portion.

In the above construction, it may be preferable to further comprise an indicator for indicating a slide position of the height adjusting member. According to this construction, the slide position of the height adjusting member can be easily understood.

In the above construction, it may be preferable to further comprise a housing for supporting the frame and an image forming assembly for performing an image forming operation based on a document image data read by the optical system.

An image forming apparatus according to still another object of the present invention comprises an apparatus main body having a housing structure and adapted to perform an image forming operation based on a document image data read by an optical system; an image reading station having a housing structure, arranged above the apparatus main body and accommodating the optical system including an optical component for irradiating a document to be read with light and receiving the reflected light in the housing; a supporting frame horizontally arranged on the upper surface of the apparatus main body for supporting a part of the bottom surface of the image reading station; a height adjusting member attached to the supporting frame in such a manner as to be slidable in a horizontal direction and having a supporting surface for supporting another part of the bottom surface of the image reading station; and an adjustable member to be attached to the bottom surface of the image reading station, wherein the supporting surface of the height adjusting member includes at least a first supporting surface set at a specified first height position and a second supporting surface set at a second height position different from the first height position; and the adjustable member is supported by the supporting surface of the height adjusting member and has the height position thereof adjusted by being supported by the first or second supporting surface as the height adjusting member is slid.

According to this construction, as the position of the adjustable member with respect to the bottom of the image reading station changes by sliding the height adjusting member in the horizontal direction, the position of the upper surface of the height adjusting member supporting the adjustable member changes to adjust the height of the adjustable member. In this way, the height of the image reading station having the adjustable member attached to the bottom surface thereof is adjusted. Accordingly, the inclination of the optical system can be adjusted even after the optical system is assembled into the image reading station.

In the above construction, the supporting surface of the height adjusting member may be preferably formed to have a stepped shape along a sliding direction thereof.

The lower surface of the adjustable member may be preferably formed to have a stepped shape opposite to that of the supporting surface of the height adjusting member along the sliding direction of the height adjusting member. According to this construction, the adjustable member and the height adjusting member are held in surface contact at a plurality of positions, thereby being able to stabilize the supported state of the adjustable member by the height adjusting member.

This application is based on patent application Nos. 2007-071002 and 2007-074301 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by

What is claimed is:

1. An optical unit assembly, comprising:
an optical system including an optical component for irradiating a target object with light and receiving the reflected light;
a casing for accommodating the optical system;
a supporting frame for supporting a part of the casing; and
a height adjusting member having a supporting surface for supporting another part of the casing and placed between the supporting frame and the casing, and
a lifting mechanism for permitting the casing to be slightly lifted, the slightly lifted state being attained by supporting a part of the casing by means of the supporting frame while releasing the support of another part of the casing by the supporting surface of the height adjusting member;
wherein:
the height adjusting member is slidable between the supporting frame and the casing in a supported state that the casing is substantially supported by the supporting frame; and
the supporting surface includes at least a first supporting surface set at a specified first height position and a second supporting surface set at a second height position different from the first height position.

2. An optical unit assembly according to claim 1, wherein the height adjusting member includes an operable portion operable from the outside with the height adjusting member assembled between the supporting frame and the casing.

3. An optical unit assembly comprising;
an optical system including an optical component for irradiating a target object with light and receiving the reflected light;
a casing for accommodating the optical system;
a supporting frame for supporting a part of the casing;
a height adjusting member having a supporting surface for supporting another part of the casing and placed between the supporting frame and the casing; and
an adjustable member to be attached to the bottom surface of the casing, wherein:
the height adjusting member is slidable between the supporting frame and the casing in a supported state that the casing is substantially supported by the supporting frame;
the supporting surface includes at least a first supporting surface set at a specified first height position and a second supporting surface set at a second height position different from the first height position so that the supporting surface of the height adjusting member is a stepped supporting surface having a stepped shape along a sliding direction of the height adjusting member, and the adjustable member is supported by the stepped supporting surface; and
the lower surface of the adjustable member is formed to have a stepped shape opposite to the stepped shape of the stepped supporting surface of the height adjusting member along the sliding direction of the height adjusting member.

4. An image reader, comprising:
an optical system including an optical component for irradiating a document to be read with light and receiving the reflected light;
a casing for accommodating the optical system;
a frame adapted to accommodate the casing and having a bottom surface portion for supporting a part of the bottom surface of the casing;
a casing supporting member to be attached to the bottom surface of the casing;
a height adjusting member attached to the bottom surface portion of the frame in such a manner as to be slidable in a horizontal direction and having a supporting surface for supporting another part of the bottom surface of the casing; and
a grip secured to the height adjusting member for giving a moving force to slide the height adjusting member along the bottom surface portion of the frame,
wherein:
the supporting surface of the height adjusting member has a stepped shape along a sliding direction of the height adjusting member;
the casing supporting member is supported by the supporting surface of the height adjusting member and has the height position thereof adjusted by being supported by the stepped supporting surface as the height adjusting member is slid, a supported surface of the casing supporting member being formed to have a stepped shape opposite to the stepped shaped of the stepped supporting surface of the height adjusting member along the sliding direction of the height adjusting member; and
the grip projects outward of the frame so as to be operable from the outside of the frame.

5. An image reader according to claim 4, wherein:
the stepped supporting surface is stepped by having a multitude of supporting surfaces at different heights with height differences of adjacent supporting surfaces being constant; and
the casing supporting member includes uneven portions that come into contact with two supporting surfaces having different heights.

6. An image reader according to claim 4, further comprising a fixing member for fixing the height adjusting member to the frame; wherein the height adjusting member is fixed to the frame by attaching the fixing member while being made slidable by detaching the fixing member.

7. An image reader according to claim 6, wherein:
the frame is formed with a window portion; and
the fixing member is attachable or detachable through the window portion.

8. An image reader according to claim 4, further comprising an indicator for indicating a slide position of the height adjusting member.

9. An image reader according to claim 4, further comprising a housing for supporting the frame and an image forming assembly for performing an image forming operation based on a document image data read by the optical system.

10. An image forming apparatus, comprising:
an apparatus main body having a housing structure and adapted to perform an image forming operation based on a document image data read by an optical system;
an image reading station arranged above the apparatus main body and having a housing structure for accommodating the optical system including an optical component for irradiating a document to be read with light and receiving the reflected light in the housing;
a supporting frame horizontally arranged on the upper surface of the apparatus main body for supporting a part of the bottom surface of the image reading station;
a height adjusting member attached to the supporting frame in such a manner as to be slidable in a horizontal direction and having a supporting surface for supporting another part of the bottom surface of the image reading station; and an adjustable member to be attached to the bottom surface of the image reading station, wherein:

the supporting surface of the height adjusting member having a stepped shape along a sliding direction of the height adjusting member; and the adjustable member is supported by the supporting surface of the height adjusting member and has the height position thereof adjusted by being supported by the stepped supporting surface as the height adjusting member is slid, a supported surface of the adjustable member being formed to have a stepped shape opposite to the stepped shape of the stepped supporting surface of the height adjusting member along the sliding direction of the height adjusting member.

* * * * *